A. A. KELLOGG.
CULTIVATOR.
APPLICATION FILED APR. 11, 1910.
989,365.
Patented Apr. 11, 1911.
2 SHEETS—SHEET 1.
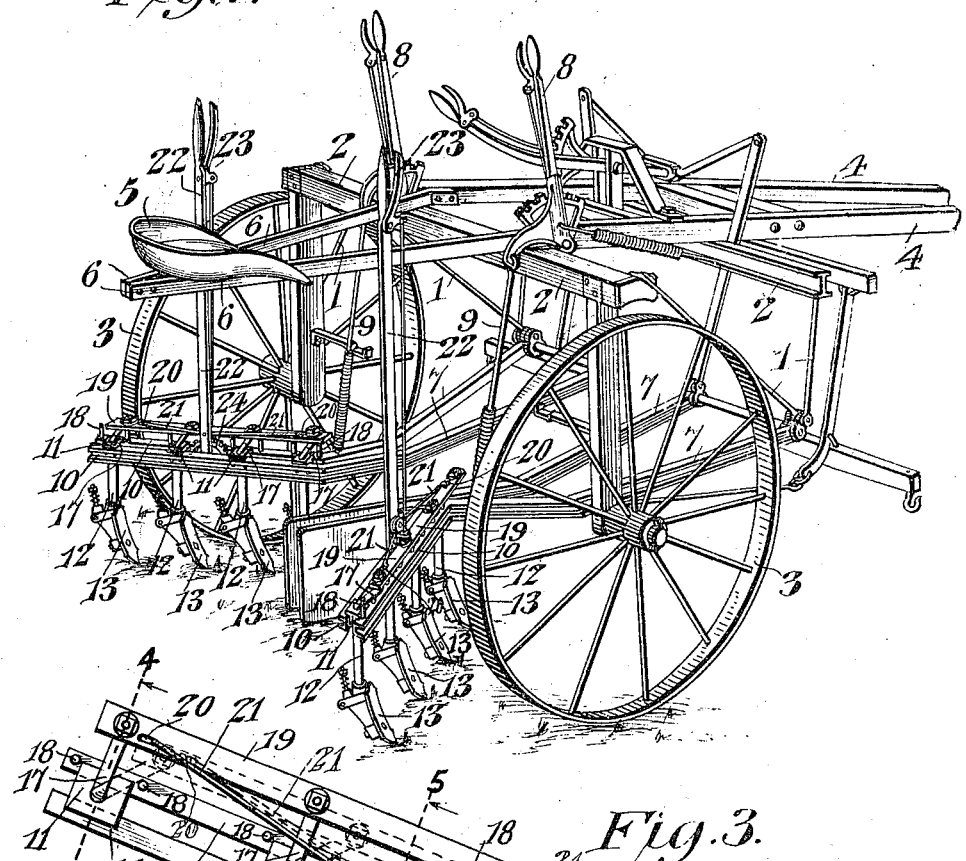
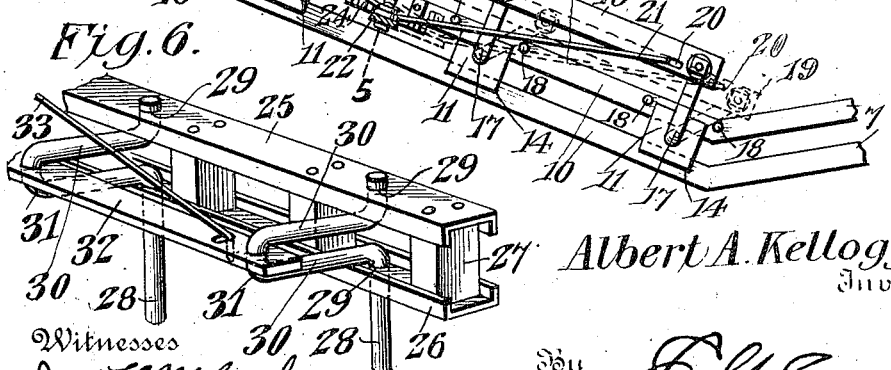
Albert A. Kellogg,
Inventor

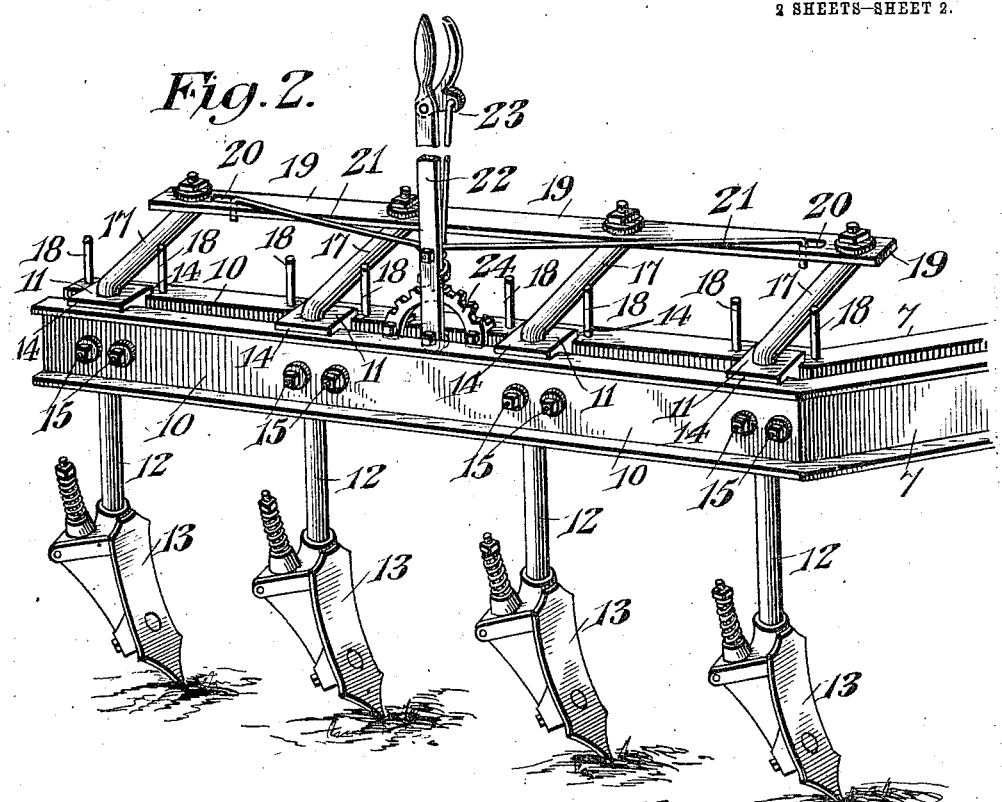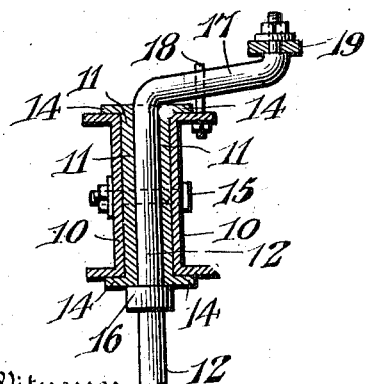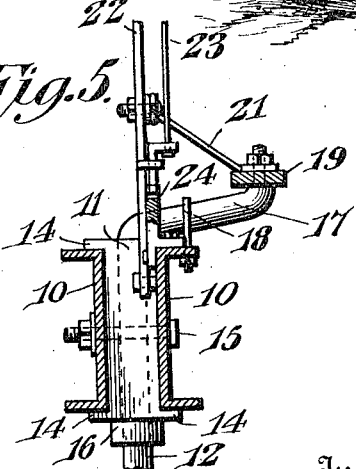

UNITED STATES PATENT OFFICE.

ALBERT A. KELLOGG, OF CLINTON, MISSOURI.

CULTIVATOR.

989,365.

Specification of Letters Patent. Patented Apr. 11, 1911.

Application filed April 11, 1910. Serial No. 554,894.

*To all whom it may concern:*

Be it known that I, ALBERT A. KELLOGG, a citizen of the United States, residing at Clinton, in the county of Henry and State of Missouri, have invented a new and useful Cultivator, of which the following is a specification.

My invention relates to cultivators and consists in certain novel features which will be hereinafter first fully described and then more particularly pointed out in the appended claims.

With the wheeled cultivators now in use, so far as I am aware, the soil is thrown continually in the same direction. When plowing on level ground, the shovels are arranged to throw the soil up against the plants and when working on the side of a hill, the shovels on the upper side will throw the soil against the plant with such force that it either covers the plant or breaks it down.

One object of my invention, therefore, is to provide a cultivator in which the shovels may be adjusted to overcome this difficulty without stopping the travel of the machine so that the shovels on the upper side will throw the dirt away from the plants and thereby avoid the injury to the same which heretofore occurred.

It also frequently happens that in the same field there will be high and low ground and, while the high ground will be dry enough to work, the low ground will be wet. If the shovels are set to throw the soil to the plant on the dry ground and can not be readily shifted from that position when the cultivator reaches the wet ground, the soil will roll into large lumps, and if these lumps are thrown against the plants, will cover them up or break them down.

One object of my invention, therefore, is to provide a cultivator which may be readily adjusted to work in either dry or wet ground without loss of time and without requiring the substitution of any parts for those which may be in use, and without requiring the driver to dismount.

A further object of my invention is to provide means by which the several shovels at either side of the cultivator may be simultaneously adjusted without affecting the shovels at the other side of the cultivator, and may be locked in their adjusted position so as to be prevented from accidentally moving therefrom.

A still further object of the invention is to provide a construction by which the vertical movement of the shovels in their supports will be positively prevented, and all these objects and such other incidental objects as will hereinafter appear are attained in the mechanism illustrated in the accompanying drawings.

In the drawings, Figure 1 is a perspective view of a wheeled cultivator showing my improvements applied thereto. Fig. 2 is an enlarged perspective view of a gang of shovels removed from the cultivator. Fig. 3 is a plan view of the same showing the movement of the shovels by full and dotted lines. Fig. 4 is a transverse vertical section on the line 4—4 of Fig. 3. Fig. 5 is a detail transverse section on the line 5—5 of Fig. 3. Fig. 6 is a detail perspective view showing a slight modification.

The wheeled cultivator may be of any well known construction and is shown as provided with hangers 1 depending from cross bars 2, the rear cross bar 2 serving also as the arch of an axle on which are mounted the carrying wheels 3. The hangers are arranged at both sides of the tongue 4 and a driver's seat 5 is secured on rearwardly-extending bars 6 forming a part of the cultivator frame.

The cultivator beams 7 are supported at their front ends by the hangers 1 and may be raised or lowered by means of levers 8 mounted upon the frame and connected with the same through links 9 in the ordinary manner, and as will be readily understood. In carrying out my invention, the beams are constructed of parallel members or sections 10 consisting of channel irons spaced apart and maintained in their proper relative positions by spacing blocks 11 which also form the bearings for the stems or shanks 12 to which the cultivator shovels 13 are secured. The blocks 11 are substantially I-shaped in cross section, being provided with flanges 14 at their upper and lower ends which project over and under the upper and lower sides or edges of the channel iron members 10, and are rigidly secured to the said members by bolts 15 inserted through the blocks and both members, as will be readily understood. The stems or shanks 12 which carry the cultivator shovels are journaled in the central bores of the blocks 11 and are provided below the said blocks with annular shoulders 16 bearing against the under sides or lower ends of the blocks and thereby preventing upward movement of the stems, as clearly shown in Fig. 4. The upper portions of the stems are bent laterally to provide crank arms 17 which ride upon the upper ends of the blocks and thereby prevent downward movement or dropping of the stems. These crank arms 17 play between pins 18 rising from the cultivator beam at opposite sides of the crank arms to limit the movement of the same. The free ends of the crank arms 17 are connected by a bar or strap 19 in which they are pivotally engaged, and near the ends of the said bar or strap are slots 20 in which the ends of links or connecting rods 21 play. These links or connecting rods 21 extend inward from the ends of the connecting bar 19 and are pivotally attached to the side of the operating lever 22 which is pivoted to one of the members 10 of the beam and is equipped with the usual latch 23 adapted to engage a quadrant 24 secured on the beam concentric with the pivot of the lever.

When the lever 22 is in its central or upright position, the ends of the links 21 will lie at the inner ends of the transverse slots 20 in the connecting bar 19 and the crank arms 17 will extend from the cultivator beam at right angles thereto. If the lever be moved either forward or backward, the links 21 will transmit the movement of the lever to the connecting bar 19 and through the said bar the crank arms 17 will be swung forward or backward so that the stems 12 will be rotated in their bearings and the cultivator shovels consequently adjusted to a different angle to throw the soil in another direction, as may be necessary under the conditions controlling the operation of the machine. The cultivator shovels, it will be seen at once, will thus be simultaneously adjusted so as to assume a uniform inclination with respect to the cultivator beam and, consequently, will throw the soil in the desired direction with certainty. As the crank arms swing about their respective shanks, the connecting bar 19 will, of course, be moved closer to or farther from the plane of the operating lever, as will be readily understood on reference to the dotted lines in Fig. 3. Were the outer ends of the links 21 in fixed connection with the bar 19, the movement of the parts would tend to bend and break the said links, and, in order to permit the said links to have free play upon the connecting bar 19 so as to accommodate this difference in relation between the connecting bar and the operating lever, the ends of the links are mounted in the slots 20 through which they may ride as the connecting bar moves closer to the plane of the link. Bending of the links will consequently be positively prevented and the binding of the same on the connecting bar so as to interfere with the easy adjustment of the parts is avoided.

In Fig. 6, I have shown a modified application of the invention, in which the beam is composed of upper and lower members 25 and 26 consisting of channel irons having their channels disposed on their inner faces, and spacing blocks 27 are secured between the said members to maintain them in their proper relative positions. Alined openings are formed in the members 25 and 26 between the spacing blocks and the shanks 28 of the cultivators are journaled in these openings, as indicated at 29, the portions of the shanks between the members being bent laterally to furnish U-shaped crank arms 30, the bights 31 of which are engaged by the connecting bar 32 which is actuated from the operating lever through links 33, in the same manner as the similar parts are operated in the construction illustrated in the other figures.

It will be readily seen that my device is simple and strong in construction and will not be expensive to manufacture. The operating levers will extend up to a point where they may be easily manipulated from the driver's seat and either gang of shovels may be adjusted without affecting the operation of the other gang, so that the soil turned up and thrown to one side by either gang may be so disposed as to produce the desired growth of the plants without any of the disadvantages or causing any of the damage to the plants which was heretofore found unavoidable.

The advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. The combination of a beam comprising spaced members, blocks secured between the said members and provided at their upper and lower ends with lateral flanges engaging the upper and lower sides of the beam, shovel-carrying stems journaled in the said blocks and provided with annular shoulders engaging the lower ends of the blocks and with crank arms riding over the upper ends of the blocks, and means acting on the said crank arms to rotate the said stems.

2. The combination with a cultivator beam, of shovel-carrying stems rotatably mounted therein, means for simultaneously rotating the said stems, and stops on the upper side of the beam to limit the movement of the stems.

3. The combination with a cultivator beam, of shovel-carrying stems rotatably mounted in the beam and provided with crank arms at their upper ends projecting over the beam, means mounted on the beam and acting on the said crank arms to rotate the said stems, and pins projecting upward from the beam at opposite sides of the crank arms to limit the movement of the same.

4. The combination with a cultivator beam, of shovel-carrying stems rotatably mounted in the beam and provided with lateral crank arms, a connecting bar pivotally attached to all of the said crank arms and provided near its ends with slots, an operating lever mounted on the beam, and links pivoted at their inner ends to the said operating lever and having their outer ends playing in the said slots in the connecting bar.

5. In a cultivator, a gang of cultivator shovels each having a stem bent to form an integral crank extension, a beam formed of joined spaced channel members, said beam having journal bearings for the shovel stems, and an adjusting mechanism common to all the shovel stems of the gang for moving all the shovels simultaneously each about the longitudinal axis of its individual stem.

6. In a cultivator, a beam formed of channel irons joined together in parallel relation with interposed spacing blocks coacting with the flanges of the channel irons to maintain the relation of the latter one to the other, shovels having stems journaled in the beam so formed, and also provided with integral crank extensions, and an actuating member for the shovels having a common connection with all the crank extensions of the shovel stems carried by the beam.

In testimony, that I claim the foregoing as my own, I have hereto affixed my signature in the presence of two witnesses.

ALBERT A. KELLOGG.

Witnesses:
M. T. WOOD,
GARLAND L. DAVIS.